(12) United States Patent
Bussey, Jr. et al.

(10) Patent No.: US 7,475,477 B2
(45) Date of Patent: Jan. 13, 2009

(54) METHOD FOR MAKING DRAINAGE ELEMENTS

(76) Inventors: Harry Bussey, Jr., 960 Cape Marco Dr., Unit 1803, Marco Island, FL (US) 33937; Buddy Harry Bussey, III, 4 Windy Hill, Atlantic Highlands, NJ (US) 07716

( * ) Notice: Subject to any disclaimer, the term of this patent is extended or adjusted under 35 U.S.C. 154(b) by 101 days.

(21) Appl. No.: 11/637,534

(22) Filed: Dec. 12, 2006

(65) Prior Publication Data
US 2008/0107483 A1  May 8, 2008

Related U.S. Application Data

(63) Continuation-in-part of application No. 11/591,420, filed on Nov. 2, 2006.

(51) Int. Cl.
*B01D 24/00* (2006.01)
(52) U.S. Cl. .................. 29/896.62; 29/525.01; 29/819; 29/820
(58) Field of Classification Search .................. 29/417, 29/779, 819, 820, 525.01; 53/576, 469, 473, 53/435, 409; 405/36, 43, 45, 50; 29/896.62
See application file for complete search history.

(56) References Cited

U.S. PATENT DOCUMENTS

| | | | | |
|---|---|---|---|---|
| 4,104,774 | A | * | 8/1978 | Overmyer et al. ............. 29/234 |
| 4,716,712 | A | * | 1/1988 | Gill ............................... 53/52 |
| 5,051,028 | A | * | 9/1991 | Houck et al. .................. 405/45 |
| 6,497,031 | B1 | * | 12/2002 | Houck et al. .................. 29/429 |
| 6,745,547 | B2 | * | 6/2004 | Bussey et al. ................. 53/576 |
| 6,854,924 | B2 | * | 2/2005 | Ring ........................... 405/45 |
| 7,178,224 | B2 | * | 2/2007 | Bussey et al. ................. 29/728 |
| 2003/0097827 | A1 | * | 5/2003 | Bussey et al. ................. 53/551 |
| 2003/0205035 | A1 | * | 11/2003 | Bussey et al. ................. 53/576 |

* cited by examiner

*Primary Examiner*—Jermie E Cozart
(74) *Attorney, Agent, or Firm*—Francis C. Hand; Carella, Byrne, Bain et al (57) ABSTRACT

The drainage element is made with a periphery formed of a filter material that allows the passage of water and prevents the passage of soil and a second peripheral section of net material that allows the passage of water while the preventing the passage of the lightweight aggregate therein. The filter material is preferably made of spun bonded polyester and may be made of a biodegradable material such as starch.

12 Claims, 6 Drawing Sheets

METHOD FOR MAKING DRAINAGE ELEMENTS

This is a Continuation-in-Part of U.S. Ser. No. 11/591,420, filed Nov. 2, 2006 is still pending.

This invention relates to a drainage element and to an apparatus and method for making the drainage element. More particularly, this invention relates to a drainage element for use in a sewage field, water drainage field, roadside drainage ditches and the like.

As is known, drainage elements have been constructed of loose aggregate, such as foam plastic elements, beads, and other light weight materials all encased in a net-like sleeve. In some cases, a perforated plastic pipe has been incorporated in the drainage element. Various techniques have also been known for making such drainage elements in a manufacturing plant so that the individual drainage elements may then be shipped to a construction site for use. Examples of such techniques are described in U.S. Pat. Nos. 5,015,123; 5,154,543; 5,535,499; 5,657,527; and 6,173,483.

Further, use of a netting to contain the aggregate within the drainage elements while allowing water and/or effluent to pass through also allows fine particles of solid material to pass through into the aggregate from the surrounding environment. As a result, over time, the solid material can build up in the drainage element to such a degree that the drainage element becomes clogged and prevents a flow of water therethrough. In some cases, use has been made of covers in order to prevent top dirt fill from falling into the drainage elements. In other cases, such as described in U.S. Pat. No. 6,854,924, proposals have been made to incorporate a barrier material in a drainage element between the netting and the aggregate to prevent the passage of outside media, such as sand, dirt and soil, through the netting.

In cases where a tubular netting is used in the fabrication of a drainage element of the above type, the tubular netting needs to be rucked onto a tube, i.e. drawn concentrically over the tube and gathered together. Thereafter, the netting can be drawn off the tube as the netting is filled with aggregate. Typically, the length of netting rucked onto a tube is sufficient to fabricate several drainage elements. However, rucking of the netting onto a tube is time consuming and cumbersome.

Also, as described in co-pending patent application U.S. Ser. No. 11/591,420, filed Nov. 2, 2006, use is made of a membrane to encase a mass of light weight aggregate to form a drainage element that allows water to pass through but prevents the passage of soil particles into the aggregate.

U.S. Pat. Nos. 6,857,818 and 6,988,852 describe a drainage element having a casing with a first part-circumferential portion, such as a netting, having a plurality of openings therein for passage of water and a second part-circumferential portion, such as a plastic web, having a porosity to prevent the passage of water therethrough.

It is an object of this invention to provide a drainage element that employs a sleeve to encase light weight aggregate that is able to allow the passage of water while blocking the passage of soil.

It is another object of the invention to provide a simple economical method for fabricating a drainage element with a sleeve with different filtering characteristics.

It is another object of the invention to provide a simple apparatus for fabricating a drainage element with an encasing sleeve with different filtering characteristics.

It is an object of this invention to provide a drainage element of light weight aggregate with a porous net section that allows water to readily pass through and a tough tear resistant section that prevents soil particles from passing through while allowing water to pass through.

It is another object of the invention to avoid the need to ruck a tubular netting onto a tube in order to fabricate a drainage element with light weight aggregate.

Briefly, the invention provides a drainage element that is comprised of a mass of discrete lightweight aggregate that defines passageways for a flow of fluid therethrough and a sleeve encasing the mass of discrete aggregate. In accordance with the invention, the sleeve includes a first peripheral portion of a water permeable filter material and a second peripheral portion of net material having openings for retaining the aggregate and allowing the passage of water.

In one embodiment, the filter material is a membrane having a plurality of interstices characterized in being of a size for the passage of water therethrough and the filtering of fine particles of solid material from the water passing through the membrane. The membrane is further characterized in being tear resistant. For example, the membrane, as described in the parent application, has a grab tensile strength of 61/61 LBF as measured under ASTM D-5034 and a grab elongation to break in percentage of 45/50 as measured under ASTM D-5034. Preferably, the membrane is made of spun bonded non-woven polyester.

In another embodiment not requiring tear strength, the filter material is made of a biodegradable material such as starch.

The invention also provides a method of making the drainage element.

In one embodiment, the method includes the steps of generating two strips of material, namely a first strip of mesh material and a second strip of filter material. Thereafter, the two strips are secured together along one of the longitudinal edges of each to form a web. The web is then shaped about a tube in order to dispose the other longitudinal edges of the strips in facing relation to each other. Thereafter, the facing edges are secured together to define a tubular sleeve about the tube.

After the sleeve has been formed, one end of the sleeve is closed at a point space from the tube and a lightweight aggregate is then fed through the tube and into the sleeve while the sleeve is moved in a direction away from the tube. Thereafter, the filled sleeve is closed at a predetermined point spaced from the forward end of the sleeve and spaced from the tube in order to define a drainage element. The sleeve can then be severed at that point in a conventional manner in order to form a discrete drainage element.

The longitudinal edges of the respective strips of material may be secured together by applying a glue between the edges and then pressing the edges and glue together. Alternatively, the edges may be sewn together.

In another embodiment, a third strip of material, such as the same type of material as the filter strip, may be applied over the overlapped edges of the web on the tube so as to sandwich the mesh material between two strips of filter material. In this case, a glue is applied between the strips of filter material and the three layers of filter material and mesh material are pressed together to form a strong seam.

The invention also provides an apparatus for making the drainage element.

In one embodiment, the apparatus employs a tube for passing light weight aggregate therethrough and a supply means for supplying a web about said tube that is formed of a net strip secured to a filter material strip along respective longitudinal edges thereof. The supply means includes a first station for supplying the net strip, a second station for supplying the filter material strip and a securing means for securing a longitudinal edge of net strip to a longitudinal edge of the filter material strip to form the web.

The apparatus also includes a forming means for shaping the supplied web about the tube to dispose longitudinal edges of the web in overlapping relation. The forming means may be a forming collar that is disposed about the tube or a plurality of longitudinally spaced pairs of guide plates that are angularly disposed about the tube in a progressive pattern to bring the edges of the web into overlapping relation.

The apparatus also employs a securing means for securing the overlapped edges of the web together to form a sleeve about said tube and, as described in the parent patent application, means for moving a flow of aggregate through tube for filling the sleeve with aggregate and means for moving the sleeve from the tube during filling of the sleeve with aggregate.

In another embodiment, the apparatus employs a tube, as above, for passing a flow of aggregate therethrough and a pair of forming collars. One forming collar is positioned relative to the tube for shaping a continuously supplied filter material strip having a pair of longitudinal edges about the tube and the second forming collar is positioned relative to the tube for shaping a continuously supplied net strip about the tube. The second forming collar is also disposed relative to the first forming collar to overlap the longitudinal edges of the filter material strip with the respective longitudinal edges of the net strip.

The apparatus also includes means for securing the overlapped edges of the filter material strip and net strip together along two seams to form a sleeve about the tube and, as described above, tying means spaced from the tube for intermittently applying ties about the sleeve to close the sleeve on itself, means for moving a flow of aggregate through tube for filling the sleeve with aggregate and means for moving the sleeve from the tube during filling of the sleeve with aggregate.

The drainage elements may be particularly used for draining water from fields into water collecting pipelines or ponds or the like. For example, a series of drainage elements may be laid in a linear array in a trench and covered over with backfill with the filter material side up and the first drainage element in the series connected via a coupling to a storm sewer pipe or lateral pipe. In this case, water that passes through the filter material of each drainage element would flow under gravity from one drainage element to the next and down to the storm sewer pipe or lateral. In order to insure that soil does not fill up the spaces between adjacent drainage elements, a strip of filter material material is bridged over the ends of two adjacent drainage elements and secured in place by an adhesive or other suitable securing means. This strip serves to prevent fine particles from passing into the space between the two adjacent drainage elements while allowing water to pass through.

The use of a filter material that is biodegradable is particularly useful in situations where the trench in which the drainage elements are placed is backfilled with clay soils and/or compacted to such a degree that, over time, a "worm hole" is formed in the soil by the drainage elements. In such cases, the filter material can biodegrade while allowing the surrounding soil to maintain the light weight aggregate in place.

These and other objects and advantages of the invention will become more apparent from the following description taken in conjunction with the accompanying drawings wherein.

Figure 1:
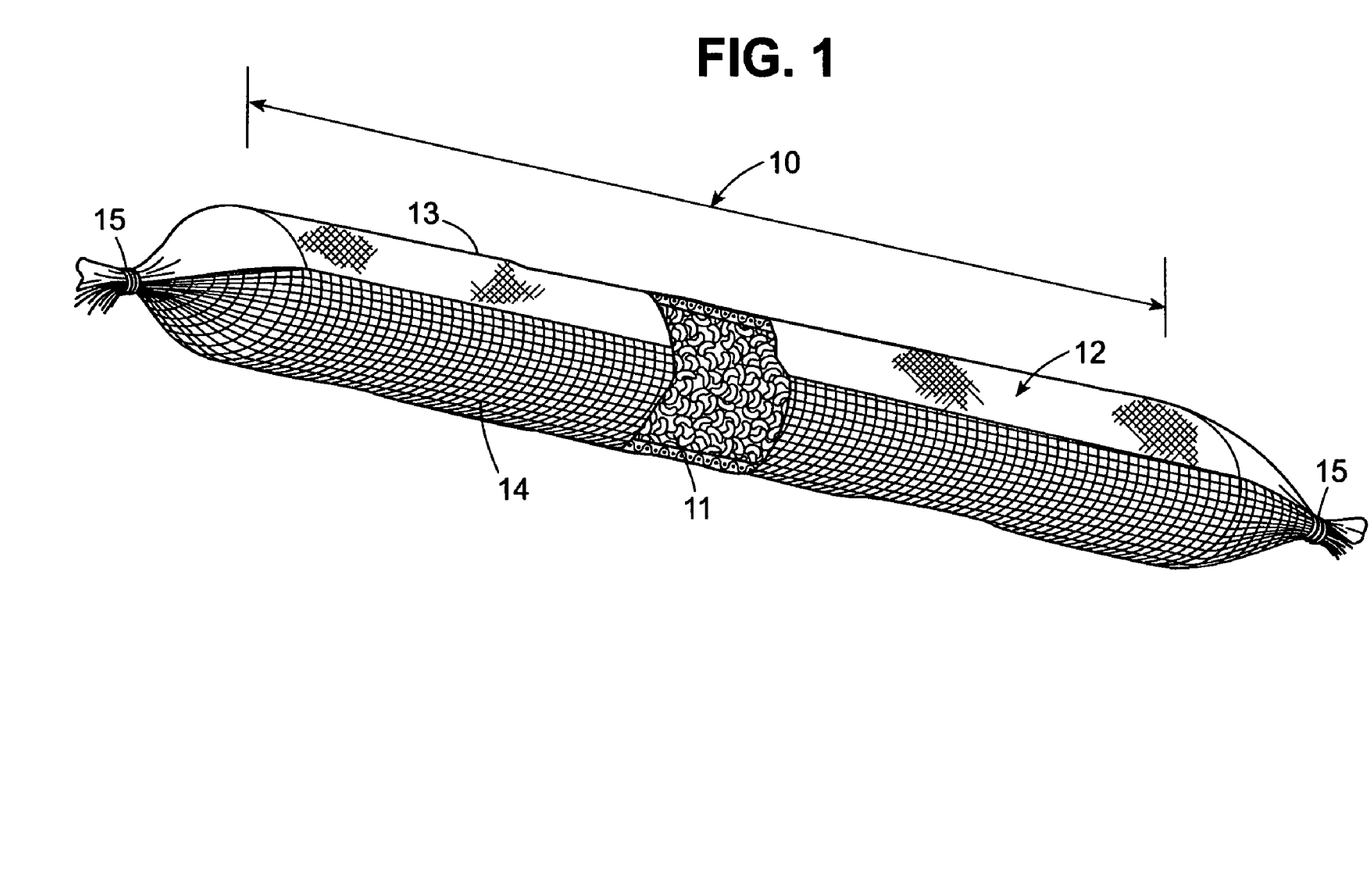
FIG. 1 illustrates a perspective view of a drainage element in accordance with the invention.

Referring to FIG. 1, the drainage element 10 is formed of a mass 11 of discrete lightweight aggregate, such as loose fill thermoplastic elements, that define passageways for a flow of fluid therethrough and a sleeve 12 that encases the mass of aggregate 11. The sleeve 12 includes a first peripheral portion 13 of a water-permeable filter material and a second peripheral portion 14 of net material. The filter material in this embodiment is a membrane material that is characterized as having a plurality of interstices that are of a size for the passage of water and the filtering of fine particles of solid material from the water passing though the membrane. The membrane material is of a nature as described in the above noted copending parent patent application.

The net material is characterized in having openings for retaining the aggregate 11 and allowing the passage of water, for example, of a size of from ⅟16 inch to 1 inch.

Each end of the drainage element 10 is closed by means of a tie 15 that closes around a gathered end of the sleeve 12 to retain the aggregate in place. Each tie 15 may be in the form of a conventional tie for holding the gathered ends of the sleeve 12 together.

The membrane 12 is made of a spun bonded non-woven polyester having a grab tensile strength of 61/61 pounds per foot (lbf) as measured under ASTM Stand D-5034 as well as a grab elongation to break in percentage (%) of 45/50 as measured under ASTM Standard D-5034. Any other suitable type of membrane material may also be used provided it has sufficient tear strength and the permeability of the membrane 12.

Figure 2:
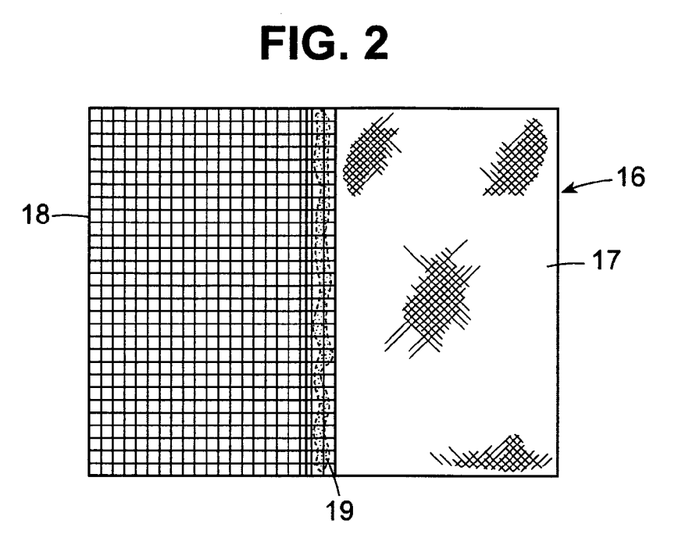
FIG. 2 illustrates a broken away view of a web of material for forming a sleeve for the drainage element of FIG. 1.
Figure 3:
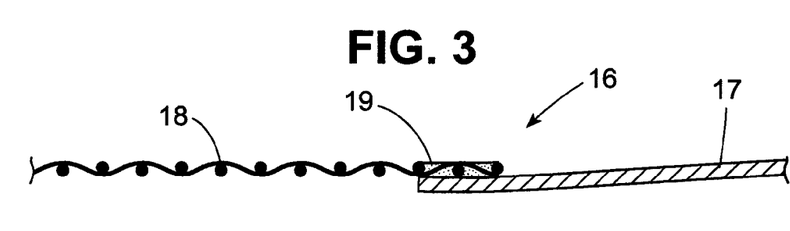
FIG. 3 illustrates a cross sectional view of a seam of the web of FIG. 2.

Referring to FIG. 2, the sleeve 12 is fabricated from a web 16 as illustrated in FIG. 2 having a strip 17 of web material secured to a strip 18 of net material. In this regard, the longitudinal edges of the two strips 17, 18 are disposed in overlapping relation as indicated in FIG. 3 and are secured together by an adhesive 19 to form a seam. The adhesive may be, for example, an EVA modified thermoplastic #GIA1051 purchased from Glue Machinery Corp. of Baltimore, Md.

Figure 4:
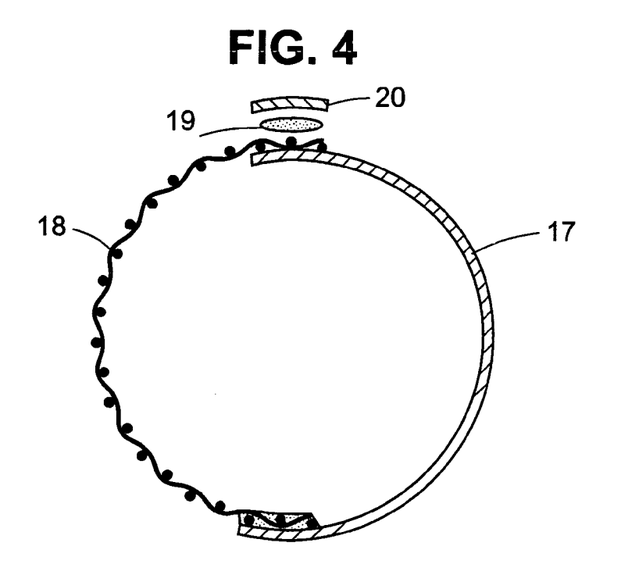
FIG. 4 illustrates a cross sectional view of a modified seam of the web of FIG. 2.

In another embodiment, as indicated in FIG. 4, a third strip 20 of membrane material may be disposed over the overlapped edges of the strips 17, 18 so that the net strip 18 is sandwiched between two membrane strips 17, 20 and secured together by adhesive 19 to form a seam.

Alternatively, the strips 17, 18 may be sewn together in overlapping relation. In this case, the edges of the two strips 17,18 are be turned outwardly and brought into parallel relationship to each other to allow sewing of the outturned edges together.

Figure 5:
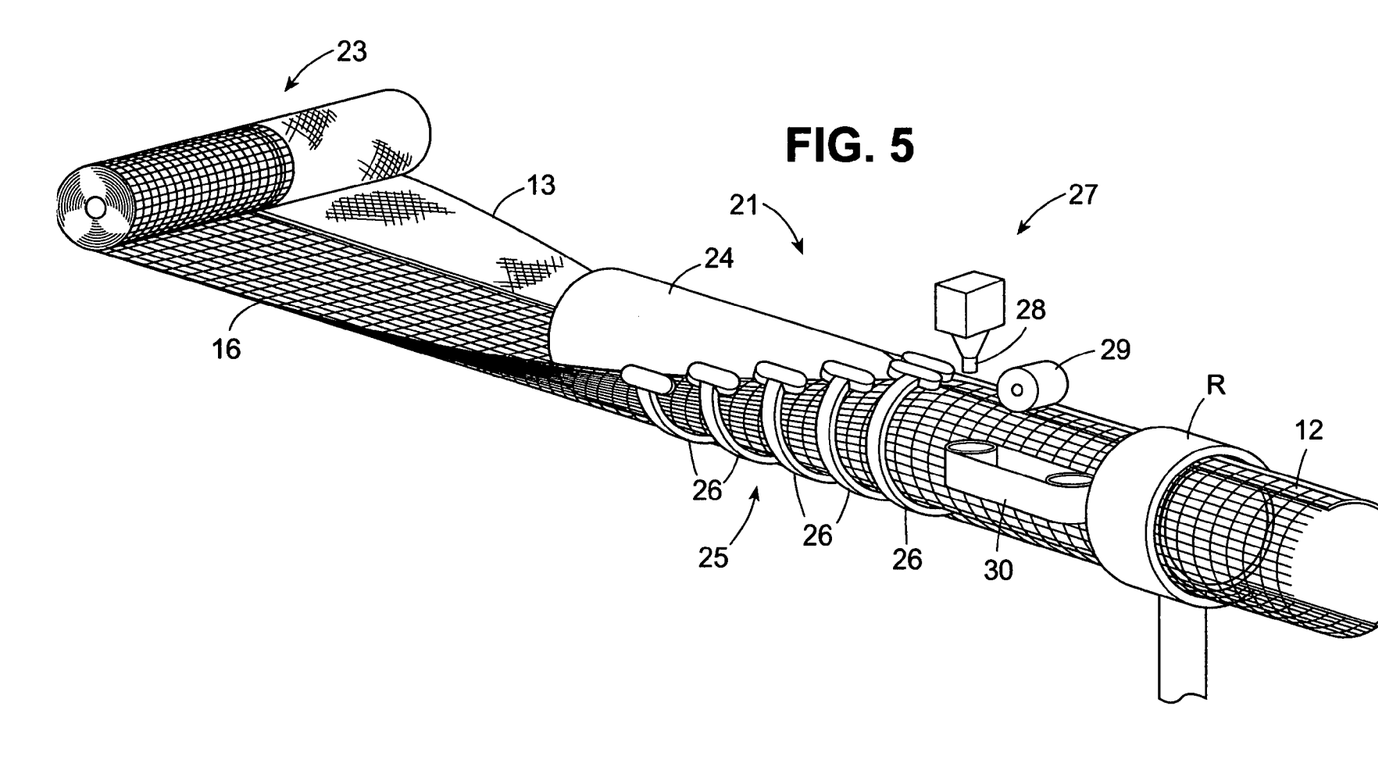
FIG. 5 illustrates an apparatus for fabricating the drainage element of FIG. 1 employing a series of guide plates.
Figure 6:
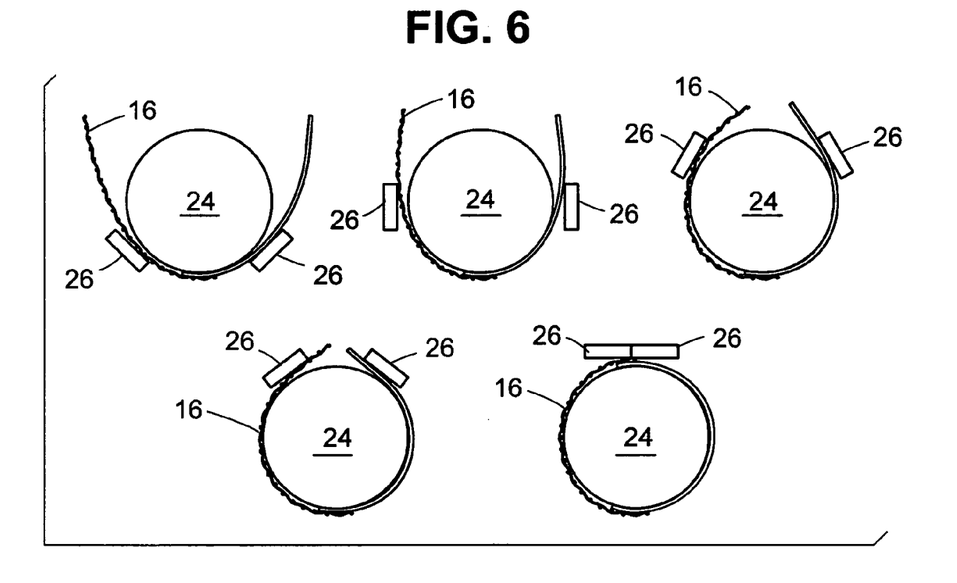
FIG. 6 illustrates the angular arrangement of the guide plates of FIG. 5.

Referring to FIG. 5, an apparatus 21 for forming the drainage element 10 includes a supply station having means (not shown) to support a roll 23 of the web material 16 for delivery to a tube 24 disposed on a horizontal axis. As indicated in FIGS. 5 and 6, a forming means 25 in the form of a plurality of longitudinally spaced pairs of guide plates 26 are angularly disposed about the tube 24 in a progressive pattern. Each pair of guide plates 26 serves to guide the delivered web 16 about the tube 24 in order to progressively bring the longitudinal edges of the web 16 into overlapping relation as indicated in FIG. 6.

The apparatus 21 also includes a securing means 27 for securing the overlapped edges of the web 16 together to form the sleeve 12 about the tube 24. This securing means 27 includes a valve 28 for expelling adhesive between the net strip 18 and the membrane strip 17 as well as a pressing roller 29 to press the two strips 17,18 and adhesive 19 together to form a strong seam.

As illustrated, a puller or capstan arrangement 30 is provided for moving the sleeve 12 from the tube 24.

Referring to FIG. 5, a choke ring R is disposed about the tube 24 near the outlet end and about the sleeve 12 in order to prevent air escaping from the outlet end of the tube 24 from backing between the sleeve 12 and the tube 24 to such an extent that the force of the air would tear apart the seam(s) formed in the sleeve 12 before the adhesive 19 has set. This choke ring R is supported by a vertical column and is of an inside diameter slightly greater than the outside diameter of the tube 24 plus twice the thickness of the sleeve 12 so that a small annular clearance is provided for passage of the sleeve 12.

A cooling means, such as a fan (not shown) may also be provided on the apparatus 21 for cooling the adhesive 19 after application. Also, holes (not shown) may be provided in the tube 24 to allow air to flow radially outward in the vicinity of the seam(s) to cool the adhesive 19. In either case, cooling of the adhesive 19 after application will speed up the setting of the adhesive and the seam(s).

The remainder of the apparatus is as described in above-noted copending parent patent application which is incorporated by reference herein.

Figure 7:
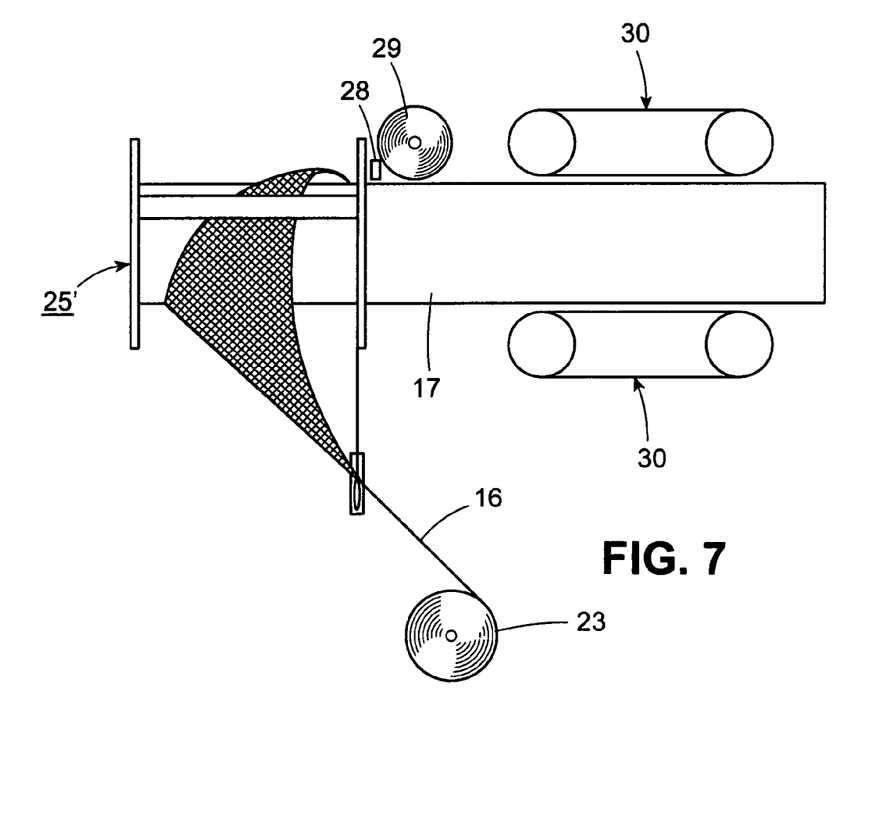
FIG. 7 illustrates a modified apparatus for fabricating the drainage element of FIG. 1.

Referring to FIG. 7, wherein like reference characters indicate like parts as above, the forming means 25' for shaping the web about the tube may be the form of a forming collar of conventional structure, such as described in the above noted copending patent application.

The apparatus for forming the drainage element 10 may also employ separate stations (not shown) for supplying the respective strips of mesh material 17 and net material 18. In this embodiment, the two strips 17, 18 are separately supplied and move to a securing means (not shown) for securing longitudinal edges of the two strips together to form the web 16.

Figure 8:
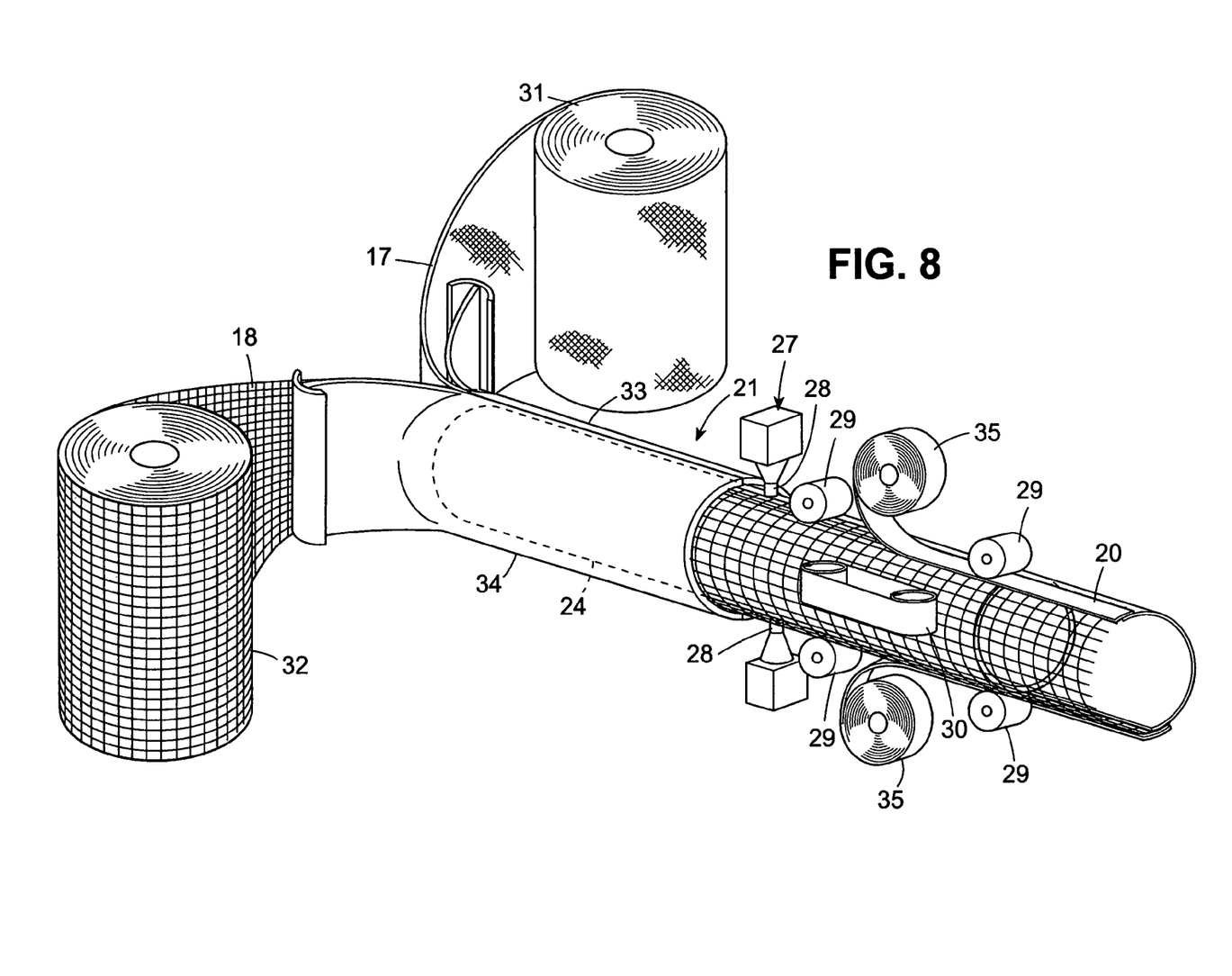
FIG. 8 illustrates a further modified apparatus for fabricating the drainage element of FIG. 1.

Referring to FIG. 8, wherein like reference characters indicate like parts as above, in still another embodiment, the two strips of membrane material 17 and net material 18 may be separately delivered to the tube 24 from separate supply stations 31, 32 and individually shaped by a respective forming collar 33, 34 into a semi-cylindrical shape with the edges of the respective strips 17, 18 disposed in overlying relation. These forming collars 33, 34 are in the form of a double forming collar manufactured by DSL of Houston, Tex.

In this case, a pair of valves 28 are disposed on opposite sides of the tube 24 for expelling adhesive 19 between the edges of the membrane and the net strips 17,18 and an overlying membrane strip 20 as above that is delivered from a roll 35. Likewise, a pair of pressing rollers 29 are provided with each roller 29 being disposed on an opposite side of the tube 24 from the other in order to press the overlapped edges of the membrane strips 17, 20 and net strip 18 together to form two seams when forming the sleeve 12. The remainder of the apparatus is as described in the above-noted copending parent patent application.

Figure 9:
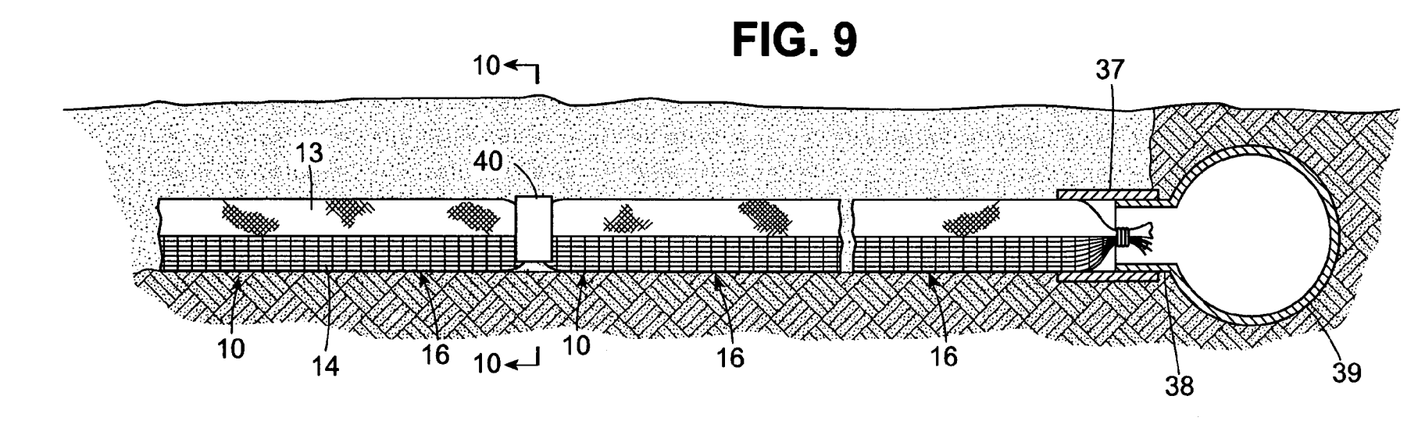
FIG. 9 illustrates a partially broken view of a water drainage system employing the drainage elements of the invention.
Figure 10:
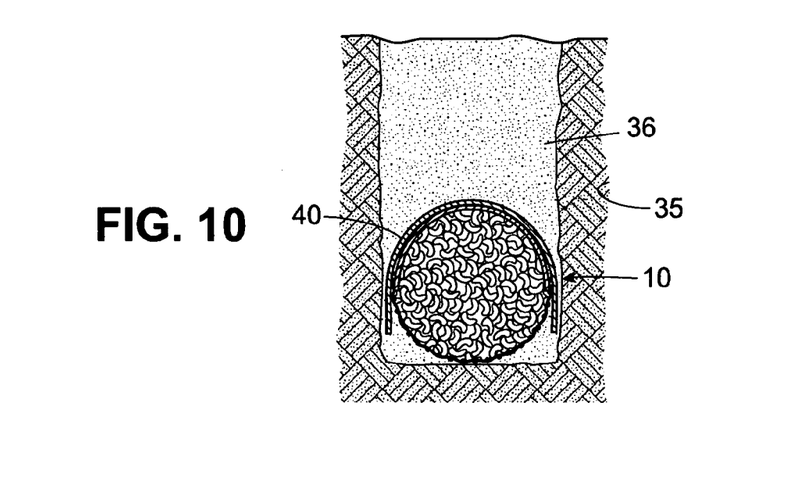
FIG. 10 illustrates a view taken on line 10-10 of FIG. 9.

Referring to FIGS. 9 and 10, wherein like reference characters indicate like parts as above, the drainage elements 10 are particularly useful in a water drainage system for draining a field of water. For example, as shown, a series of drainage elements 10 are placed in linear alignment in a trench 35 with the net side 14 of each element placed down and with the membrane side 13 placed up. After the drainage elements 10 are placed in the trench 35, backfill material 36 is deposited into the trench 35 to cover over the drainage elements 10. Since the membrane material only permits water to pass through, the soil from the backfill material 36 is prevented from passing into the drainage elements 10. The first drainage element 10 in the series is also connected via a suitable coupling 37 to a lateral pipe 38 that, in turn, connects to a storm sewer pipe 39 so that the water collected by the drainage elements 10 can flow under gravity from drainage element 10 to drainage element 10 and then to the pipes 38,39.

Where the lateral pipe 38 is a 4 inch pipe, the first drainage element 10 has a diameter of 4 inches and is coupled to the pipe 38 by a suitably sized coupling 37. In a case where the drainage element 10 has a larger diameter, the drainage element 10 may be provided with a short length of pipe (not shown) at the foremost end, for example, as described in the parent patent application U.S. Ser. No. 11/591,420, that is, in turn, coupled to the lateral pipe 38.

As illustrated, a strip 40 of the membrane material is bridged over the ends of two adjacent drainage elements 10 and secured in place by an adhesive or other suitable securing means (not shown). This strip 40 serves to prevent fine particles from passing into the space between the two adjacent drainage elements 10 while allowing water to pass through. The strip 40 may be applied at the place of manufacture of the drainage elements 10 or may be applied manually in the field. For example, when applied at the place of manufacture, the strip 40 may be applied automatically about the entire circumference of the joint between two drainage elements 10. When applied in the field, the strip 40 would lay over about 180° of the circumference of a drainage element 10, i.e. the upper half. The strip 40 is of any suitable width so long as the gap between two drainage elements is bridged over.

Alternatively, any other type of cover to prevent the passage of soil may be used in place of the strip 40. For example, a rigid U-shaped cover of solid material may be used.

The tear resistant nature of the membrane material allows the drainage element 10 to be roughly handled when being placed in a trench 35 in the field. This, in turn, reduces the risk that the membrane might be punctured or otherwise compromised by shovels or like equipment used to spread the backfill material 36 over the drainage element 10.

The construction of the drainage element is such as to avoid the need to have separate layers of material incorporated in a drainage element to prevent the passage of soil. Likewise, the need for placing a layer of paper over the length of the drainage element after placement in a trench to prevent soil infiltration is unnecessary.

The drainage element may be provided with a pipe that extends entirely through the drainage element and out each end or with a short length of pipe that extends from only one end, as described in the above-noted copending parent patent application.

Where tear strength is not a factor but biodegradability is a factor, the filter material may be made of a biodegradable material, such as starch. In such cases, the apparatus and methods described above are used in the same manner to make the drainage elements. Also, the third strip of material to form a seam in the sleeve may be made of the same filter material or other suitable material.

The drainage element may be used in a horizontal disposition in a trench or the like as well as in a vertical disposition. For example, where a field, such as a golf course, or ball playing field, accumulates water after a rainstorm in a pond-like manner due to an almost impervious layer of soil at that location, the drainage elements may be used to drain the water. In such cases, a plurality of vertically disposed holes are drilled or otherwise formed through the impervious layer to a more water pervious layer, the drainage elements are placed vertically in the holes and a suitable backfill placed over the drainage elements to close the holes. Accumulated water can then drain downwardly through the drainage elements to the more water pervious layer to be drained away. This technique avoids the need to dig a trench through the field using equipment that would otherwise damage areas of the field surrounding the areas that accumulate water. In these cases also, the drainage elements may be fabricated as above with a membrane material completely or only partially enveloping the loose fill aggregate or may be fabricated with a net completely enveloping the loose fill aggregate.

What is claimed:

1. A method for making drainage elements comprising the steps of
   generating a first strip of mesh material having a pair of parallel longitudinal edges;
   generating a second strip of filter material having a pair of parallel longitudinal edges;
   securing one of said edges of said first strip to one of said edges of said second strip to form a web;
   shaping said web about a tube to dispose the other of said edges of said first strip in facing relation to the other of said edges of said second strip
   securing said other edges in facing relation to each other to define a tubular sleeve about the tube;
   closing one end of the sleeve at a point spaced from the tube;
   thereafter feeding a light weight aggregate through the tube and into said sleeve while moving said sleeve in a direction away from the tube; and
   thereafter closing the sleeve at a predetermined point spaced from said one end of the sleeve and spaced from the tube to define a drainage element.

2. A method as set forth in claim 1 further comprising the step of severing the sleeve at said predetermined point to form a discrete drainage element.

3. A method as set forth in claim 1 wherein said filter material is a membrane characterized in having a plurality of interstices being of a size for the passage of water therethrough and the filtering of fine particles of solid material from the water passing through said membrane.

4. A method as set forth in claim 1 wherein said filter material is a biodegradable material.

5. A method as set forth in claim 4 wherein said filter material is made of starch.

6. A method as set forth in claim 1 wherein said step of securing said one of said edges of said first strip to said one of said edges of said second strip includes applying a glue between said one edges and pressing said one edges and glue together.

7. A method as set forth in claim 1 wherein said step of securing said one of said edges of said first strip to said one of said edges of said second strip includes sewing said one edges together.

8. A method as set forth in claim 1 wherein the aggregate is pneumatically fed through the tube and into said sleeve.

9. A method as set forth in claim 1 wherein said step of securing said other edges includes overlapping said other edges, applying a third strip of membrane material over said overlapping other edges to sandwich said other edge of said first strip between said third strip and said other edge of said second strip, applying a glue between said third strip and said second strip, and pressing said third strip against said second strip.

10. A method of making a drainage element comprising the steps of
    forming a longitudinal strip of filter material about a tube, said filter material characterized in being permeable to the passage of water therethrough and impermeable to the passage of fine particles of solid material in the water passing through said filter material;
    forming a longitudinal strip of net about the tube, said net having longitudinal edges disposed in overlapping relation with respective longitudinal edges of said filter material;
    securing said longitudinal edges of the filter material and the net together to define a tubular sleeve about the tube;
    closing one end of the sleeve at a point spaced from the tube;
    thereafter feeding aggregate through the tube and into said sleeve while moving said sleeve along a linear path; and
    thereafter closing said sleeve at a predetermined point spaced from said one end of the sleeve and in spaced relation to the tube to define a drainage element.

11. A method as set forth in claim 10 further comprising the step of placing a longitudinal bead of adhesive between said longitudinal edges of said filter material and pressing said edges together to bond said edges to each other.

12. A method as set forth in claim 10 further comprising the step of feeding a third strip of material over the overlapped edges of the first filter material strip and net strip to sandwich each longitudinal edge of the net material between the filter material strip and the third strip of material.

* * * * *